United States Patent Office 3,251,847
Patented May 17, 1966

---

3,251,847
ALKYLATION OF HETEROCYCLIC COMPOUNDS
Phillip S. Landis, Woodbury, and Paul B. Venuto, Cherry Hill Township, Camden County, N.J., assignors to Socony Mobil Oil Company, Inc., a corporation of New York
No Drawing. Filed May 21, 1963, Ser. No. 282,116
21 Claims. (Cl. 260—290)

This invention relates to the alkylation of heterocyclic compounds in the presence of an alumino-silicate having unique catalytic activity and in particular, alkylation of heterocyclic compounds such as the pyrroles, furans, pyridines, thiophenes and the like, in the presence of the alumino-silicate catalysts.

This invention contemplates alkylation of heterocyclic compounds in the presence of a catalyst prepared from synthetic and naturally occurring alumino-silicates having active cation sites within their ordered internal structures. These active cation sites are produced by exchangeable metal and/or hydrogen ($H^+$) cations chemisorbed or ionically bonded within the alumino-silicate catalyst; preferably, the cations are such that acid sites ($H^+$) are formed within the catalyst. The term "acid site" refers to an active cation site formed from a hydrogen cation ($H^+$). In addition, this invention particularly concerns effecting reaction of a heterocyclic compound such as furan, thiophene, pyrrole, pyridine or the like, with an alkylating agent in the presence of the heretofore described catalyst at operating conditions which promote high activity for such alkylation reactions.

It has been found that heterocyclic compounds can be continuously alkylated at low temperatures and in a vapor, a liquid, or a mixed liquid-vapor phase in the presence of an alumino-silicate catalyst having active cation sites produced by exchangeable metal and/or hydrogen cations within its ordered internal structure. The exchangeable cations may be present within the catalyst as a result of conventional base exchanging of the cations for those of certain synthetic or naturally occurring alumino-silicates, incorporating the cations during the formation of a synthetic alumino-silicate or being the exchangeable cations usually found as an integral portion of a naturally occurring alumino-silicate zeolite.

In accordance with this invention, the unique activity of the alumino-silicate catalyst for promoting alkylation of heterocyclic compounds under certain reaction conditions is dependent on the concentration of acid sites formed within its ordered internal structure and on the availability of these sites for contact with the reactants. In general, the activity of a catalyst having a sparse distribution of acid sites is more effective for alkylating heterocyclic compounds having a polar orientation of electron densities within the ring nucleus. This polar orientation is caused by the configuration as well as the hetero atom or atoms which together make up the heterocyclic ring.

Apparently, hetero atoms such as nitrogen, oxygen, sulfur, and the like, form either an electro-positive or negative pole (zone of low or high electron density) within the heterocyclic compounds depending on the electrochemical properties of the hetero atom and the number of members within a particular ring configuration. For example, in the pyrrole ring structure (a five-member ring having several possible conjugated bond positions), the nitrogen atom bears a fractional positive charge and therefore has little tendency to accept protons ($H^+$); while in the pyridine ring (a six-member ring similar to benzene) the nitrogen atom, in its customary role of an electron attracting atom, acquires an additional pair of electrons from carbon atoms in either the alpha or the gamma positions of the ring and thereby has a negative charge.

Because of the polar orientation of certain heterocyclic compounds, it has been found that acid alumino-silicate catalyst having a high concentration of acid sites tend to bond the heterocyclic compounds and consequently reduce the availability of the other cation sites for effecting alkylation by blocking off the internal pore structure of the alumino-silicate catalyst.

It is believed that the alumino-silicates having a sparse distribution of acid sites effect alkylation more readily because the bond distance between adjacent acid sites is such that the accumulative proton ($H^+$) density or acidic strength of the adjacent sites is insufficient to attract and cause bonding of the polar oriented heterocyclic compound. However, it has also been found that those heterocyclic compounds which exhibit a slightly basic nature (an affinity for proton), such as the pyridines, have a greater tendency to bond with the acid sites within the alumino-silicate catalyst than those compounds having a slightly acidic nature (non-affinity for protons). Consequently, when alkylating slightly acidic heterocyclic compounds such the the pyrroles, or the like, an alumino-silicate catalyst having a higher concentration of acid sites may be employed because the acidic nature of the hetero atom reduces the bonding effect of the acid sites.

Alumino-silicate catalysts having a sparse distribution of acid sites may be prepared by various methods. In certain instances this distribution of acid sites is obtained by using certain synthetic alumino-silicates or naturally occurring alumino-silicates having metal exchangeable cations within their ordered internal structure. In others, the desired distribtiun of acid sites is produced by using metal and/or hydrogen cations to replace the exchangeable cations of an alumino-silicate. However, because some alumino-silicates are not stable to direct acid treatment or are not stable in an acid form, it is often necessary to exchange additional metal cations with the alumino-silicate to achieve the necessary stability and the desired distribtuion of acid sites.

It will be appreciated that not all metal cations will produce the desired acid site distribution. In accordance with this invention, it has been found that the presence of certain metals, especially polyvalent metal cations, within the alumino-silicates causes the formation of acid sites ($H^+$) within their ordered internal structure. It is believed that these metals, particularly those which have higher valences of three or more such as the rare earth metals, produce acid sites within the alumino-silicate because of the spatial arrangement of the $AlO_4$ and $SiO_4$ tetrahedra which make up the ordered internal structure of the alumino-silicates. Within certain alumino-silicates, where nearly every other tetrahedron has an exchangeable cation site (usually an alkali metal or alkaline earth metal), a polyvalent cation (two valent and even some three valent cations) may be accommodated within chemical bond distance by two or three, respectively, neighboring cation sites. However, if this accommodation is not spatially feasible, it is believed that the polyvalent metal cation is hydrolyzed thereby reducing its valence by the addition of one (or more, depending on its valency) hydroxy groups (OH)⁻ and creating (from water molecules present in the alumino-silicate structure) a hydrogen cation (for each [OH]⁻ group) which then occupies one of the sites vacated by the exchangeable cation. Thus, those metals having higher valences generally provide a higher concentration of acid sites. It will be appreciated that the formation of acid sites within an alumino-silicate may occur by base exchanging these metal cations with an existing alumino-silicate or during the formation of a synthetic alumino-silicate in an ionizable medium. In addition, it will also be appreciated that the degree to which an alumino-silicate has been base exchanged with these metals will also determine the concentration of acid sites.

It should be noted that in some instances there is no patent evidence for the presence of the hydrogen cation in the absence of reactants. For instance, some of the catalysts of this invention when contacted with water may be found to confer a neutral or even alkaline reaction to the water. In such instances, the hydrogen cation is believed to form under reaction conditions, for example, by dislocation, for the alkali metal in contact with the reactant and/or traces of impurities such as water, carbon dioxide, and the like.

Furthermore, the stability and distribution of active cation sites found within an alumino-silicate is also affected by the silicon to aluminum atomic ratio within its ordered internal structure. In an isomorphic series of crystalline alumino-silicates the substitution of silicon for aluminum in the rigid framework of the lattice results in a decrease of total cation sites as evidenced by elemental analysis and the reduction of exchange capacity. Thus, among the faujasite isomorphs, the zeolite known as "Y" will have a sparser distribution of sites within the pores than the zeolite known as "X" (these zeolites are hereinafter described in better detail). It has been found that alumino-silicates having a high silicon to aluminum atomic ratio are more desirable for preparing the catalysts of this invention; preferably, the silicon to aluminum atomic ratio is at least 1.8. These catalysts may be readily treated with solutions which contain hydrogen ions and are readily regenerable, after having been used, by contact at elevated temperatures with an oxygen containing stream under controlled conditions such that the carbonaceous residues may be efficiently removed without damaging the essential structure and property of the catalyst.

In accordance with this invention, it has been found that cations of metals having lower valences, such as the alkali metals and the alkaline earth metals, are particularly effective for producing the active cation sites (sparse distribution of acid sites) necessary for the alkylation of furans, pyridines, and the like, within the alumino-silicate catalysts. In addition, as heretofore disclosed, because some alkylatable heterocyclic compounds have a low affinity for protons, e.g., pyrroles, and are not bonded to the catalyst as readily as other heterocyclic compounds, other metals of higher valences as well as hydrogen cations may by exchanged with the alumino-silicates to provide effective catalysts. It will be appreciated that the degree of base exchange may be controlled so that the concentration of acid sites is kept within acceptable limits whereby the alkylatable compound is not adversely bonded by the higher concentration of acid sites. Furthermore, it will be appreciated that alumino-silicates such as the synthetic faujasite, zeolite Y, which have a sparse distribution of exchangeable cation sites, may be base exchanged with hydrogen cations or cations convertible to the hydrogen cations to provide catalysts for the process of this invention.

The unique activity of the alumino-silicate catalysts for effecting alkylation is also dependent on the availability of the active sites. Accordingly, the defined pore size of an alumino-silicate is to be considered when preparing the catalyst of this invention. Generally, the alumino-silicate should have a pore size about 6 A. in diameter so that it can accept heterocyclic compounds within its ordered internal structure. Preferably, the pore size is from about 7 A. to 13 A. in diameter. It will be appreciated that the pore size required for a particular catalyst will depend on the heterocyclic compound to be akylated as well as the alkylating agent being employed.

Advantageously, several different alkylating agents can be used for the alkylation reactions of this invention. The preferred alkylating agents are olefins, such as ethylene, propylene, dodecylene and the like (those olefins containing 2 to 20 carbon atoms being particularly suitable); alkyl halides such as ethyl chloride, propyl bromide, and the like, and paraffinic alcohols, i.e., methanol, ethanol, propanol, and the like; in general, the alkyl radical portion thereof having from 1 to 20 carbon atoms. In addition, unsaturated cyclic compounds such as cyclohexene, aromatic compounds having substituents containing reactive alkyl groups such as anisole, and the like, can be effectively used as alkylating agents for the purpose of this invention. It will be appreciated that other cyclic and acyclic compounds may be also employed as alkylating agents. One consideration for determining the applicability of such a compound is whether or not it has sufficient thermal stability to maintain its molecular identity at the operating conditions required by this invention. Also the alkylating agent ideally should be chemically stable so that it will not readily polymerize with itself or other compounds present during the alkylation reaction. However, because some alkylating agents are particularly reactive in the presence of the catalysts of this invention and are susceptible to polymerization and other side reactions, the process may be regulated so that these agents may also be used.

Thus, it has been found that polymerization and other side reactions of the alkylating agent may be reduced by controlling the order of introducing the reactants into the reactor. The compound to be alkylated should be charged first and allowed to substantially saturate the catalyst before a highly reactive alkylating agent is introduced in the reactor. Similarly, it will be appreciated that, when shutting down the reactor for regeneration of the catalyst or the like, the alkylating agent, especially an olefin, should be purged from the reactor prior to stopping the entry of the compound to be alkylated.

The heterocyclic compounds which may be alkylated by the process of this invention include those ring compounds which contain in their nucleus, besides carbon atoms, one or more hetero atoms such as nitrogen, oxygen, sulfur, selenium, arsenic, mercury, phosphorous, and the like; preferably the heterocyclic compounds contain an atom of nitrogen, oxygen, or sulfur. These alkylated compounds may have ring structures composed of from three to eight members and may be either mono- or poly-cyclic in structure. Exemplary of these hetero-cyclic compounds are the pyrroles, furans, thiophenes, pyridines, pyrans, thiophans, and the like, and condensed systems thereof. Typical of such condensed systems are indoles, benzofurans, thionaphthalenes and the like. It will be appreciated that the heterocyclic compounds may have substituents such as alkyl, phenyl, aryl, methoxy, hydroxy, the halogens, and the like, attached to their nucleus. In general, a heterocyclic compound having at least one replaceable hydrogen atom attached to its ring structure may be alkylated by the process of this invention. However, it will be appreciated that the pore sizes of the catalyst determine whether a heterocyclic compound of specific molecular dimensions can contact the internal active cation sites by passing through its ordered internal structure. Accordingly, the heterocyclic compounds having ring configurations that can be accommodated by the pores of the catalyst may be more effectively alkylated than those which do not.

Typical of the alumino-silicate catalyst employed in accordance with this invention are several alumino-silicates, both natural and synthetic, which have a defined pore size of from 6 A. to 15 A. within an ordered internal structure. These alumino-silicates can be described as a three dimensional framework of SiO₄ and AlO₄ tetrahedra in which the tetrahedra are cross-linked by the sharing of oxygen atoms whereby the ratio of the total aluminum and silicon atoms to oxygen atoms is 1:2. In their hydrated form, the alumino-silicates may be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$, and $y$ the moles of $H_2O$. The cation can be any or more of a number of metal ions depending on whether the alumino-silicate is synthesized or occurs naturally. Typical cations include sodium, lithium, potassium, calcium, etc. Although the proportions of inorganic oxides in the silicates and their spatial arrangement may vary, effecting distinct properties in the alumino-silicates, the two main characteristics of these materials is the presence in their molecular structure of at least 0.5 equivalents of an ion of positive valence per gram atom of aluminum, and an ability to undergo dehydration without substantially affecting the $SiO_4$ and $AlO_4$ framework.

One of the crystalline alumino-silicate catalysts utilized by the present invention is the synthetic faujasite designated as zeolite X and is represented in terms of mole ratios of oxides as follows:

$$1.0 \pm 0.2 \ M_{2/n}:Al_2O_3:2.5 \pm 0.5 \ SiO_2:YH_2O$$

wherein M is a cation having a valence of not more than 3, $n$ represents the valence of M, and Y is a value up to 8, depending on the identity of M and the degree of hydration of the crystal. The sodium form may be represented in terms of mole ratios of oxides as follows:

$$0.9 \ Na_2O:Al_2O_3:2.5 \ SiO_2:6.1 \ H_2O$$

Zeolite X is commercially available in both the sodium and the calcium forms.

It will be appreciated that the crystalline structure of zeolite X is different from most zeolites in that it can adsorb molecules with molecular diameters up to about 10 A., such molecules including branched chain hydrocarbons, cyclic hydrocarbons, and some alkylated cyclic hydrocarbons.

Other alumino-silicates are contemplated as also being effective catalytic materials for the invention. Of these other alumino-silicates, a synthetic faujasite having the same crystalline structure as zeolite X and designated as zeolite Y has been found to be active. Zeolite Y differs from zeolite X in that it contains more silica and less alumina. Consequently, due to its higher silica content, this zeolite has more stability to the hydrogen ion than zeolite X.

Zeolite Y is represented in terms of mole ratios of oxides as follows:

$$0.9 \pm 0.2 \ Na_2O:Al_2O_3:WSiO_2:XH_2O$$

wherein W is a value greater than 3 up to about 5 and X may be a value up to about 9.

The selectivity of zeolite Y for larger molecules is appreciably the same as zeolite X because its pore size extends from 10 A. to 13 A.

Another alumino-silicate material found to be active in the present alkylation process is a naturally occurring zeolite known as mordenite. This zeolite is an ordered crystalline structure having a ratio of silicon atoms to aluminum atoms of about 5 to 1. In its natural state it usually appears as the sodium salt which is represented by the following formula:

$$Na_8(AlO_2)_8(SiO_2)_{40}24H_2O$$

Modernite differs from other known zeolites in that its ordered crystalline structure is made up of chains of 5-membered rings of tetrahedra and its adsorbability suggests a parallel system of channels having free diameters on the order of 4 A. to 6.6 A., interconnected by smaller channels, parallel to another axis, on the order of 2.8 A. free diameters. As a result of this different crystalline framework, mordenite can adsorb simple cyclic hydrocarbons, but cannot accept the large molecules which will be adsorbed by zeolite X and zeolite Y. As a consequence of this smaller pore size, it has been found that mordenite often will be more rapidly deactivated than either zeolite X or zeolite Y at the operating conditions of the present process.

In addition, other alumino-silicates may be employed as catalysts for the alkylation processes of this invention. A criterion for the catalyst is that its ordered internal structure must have defined pore sizes of sufficient diameters to allow entry of the preselected reactants and the formation of the desired alkylation products. Also, the alumino-silicate advantageously should have ordered internal structure capable of chemisorbing or ionically bonding additional metal and/or hydrogen ions within its pore structure so that its catalytic activity may be altered for a particular alkylation reaction. Among the naturally occurring crystalline alumino-silicates which can be employed are faujasite, heulandite, clinoptilolite, mordenite, and dachiardite. These silicates are particularly effective because they have been found to have the ability to adsorb hydrocarbons containing three or more carbon atoms and also heterocyclic compound such as pyrrole within their internal structure.

One of the preferred alumino-silicate catalysts for the process of this invention is the sodium form of zeolite X, having a pore size of 13 A. This alumino-silicate is a commercially available synthetic zeolite designated as "Linde 13X." Also the calcium form of zeolite X, which has a pore size of about 10 A. and is commercially available as Linde "10X" molecular sieve material will produce a highly active alumino-silicate catalyst. Another alumino-silicate catalyst which has been found to be effective for ring alkylation is prepared from the sodium form of zeolite X as a result of a conventional treatment (base exchanging) involving partial replacement of the sodium by contact with a fluid medium containing cations of at least one of the rare earth metals. Any medium which will ionize the cations without affecting the crystalline structure of the zeolite may be employed. After such treatment, the resulting exchanged zeolite product is water washed, dried, and dehydrated. The dehydration thereby produces the characterizing system of open pores, passages, or cavities of the crystalline alumino-silicates.

As a result of the aforementioned treatment, the rare earth exchanged alumino-silicate is an activated crystalline catalyst in which the molecular structure has been changed by having metallic rare earth cations and hydrogen ($H^+$) cations chemisorbed or ionically thereto. It will be understood that the hydrogen ($H^+$) cations in rare earth exchanged catalyst result from the hydrolysis of the rare earth cations in the manner heretofore described.

Advantageously, the rare earth cations can be provided from the salt of a single metal or preferable mixture of metals such as a rare earth chloride or didymium chlorides. Such mixture are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% be weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides but having a low cerium content. It consists of the following rare earths determined as oxides: lanthanum, 45–46% by weight; cerium, 1–2% by weight; praseodymium, 9–10% by weight; neodymium, 32–33% by weight; samarium, 5–6% by weight; gadolinium, 3–4% by weight; yttrium, 0.4% by weight; other rare earths 1–2% by weight. It is to be understood that other mixtures of rare earths are equally applicable in the instant invention.

Other effective catalysts for the present alkylation process can be prepared from alumino-silicates such as zeolite Y and mordenite. Advantageously, the sodium form of zeolite Y alone may be employed as catalytic material. Also, exchange of rare earth metals for the sodium ions within zeolite X produces a highly active catalyst in a manner similar to that described for preparation of the rare earth exchanged zeolite X. In addition, because of its high acid stability, zeolite Y may also be treated by partially replacing the sodium ions with hydrogen ions. This replacement may be accomplished by treatment with a fluid medium containing a hydrogen ion or an ion capable of conversion to a hydrogen ion. Inorganic acids represent the source of hydrogen ions, whereas ammonium compounds are representative of the cations capable of conversion to hydrogen ions. It will be appreciated that the fluid medium may contain a hydrogen ion, an ammonium ion, or a mixture thereof in a pH range from about 1 to about 12.

Mordenite may be activated to serve as a catalyst for the instant invention by replacement of the sodium ion with a hydrogen ion. The necessary treatment is essentially the same as that described above for the preparation of acid zeolite Y, except that a mineral acid such as HCl is preferably used as a source of hydrogen ions. In general, the mordenite is reduced to a fine powder (approximately passing the 200 mesh sieve and preferably passing the 300 and 325 mesh sieves or finer) and then acid treated.

It will be appreciated that cations of other metals than the rare earths having mono- and poly-valences may be employed to replace the exchangeable cations from the alumino-silicates to provide a catalytic material for this alkylation process. Exemplary of some of the more effective metals are calcium, zinc, copper, magnesium, tin, cobalt, silver, and the like. Moreover, other higher valence metals such as titanium, vanadium, chromium, manganese, and iron, and the like, may also be employed. It will be understood that the chemical properties of the metal, i.e., its atomic radius, degree of ionization, hydrolysis constant and the like, will determine its suitability for exchange with a particular alumino-silicate.

The alumino-silicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline alumino-silicate. Such materials may be catalytically inert or may possess an intrinsic catalytic activity or an activity attributable to close association or reaction with the crystalline alumino-silicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline alumino-silicates may feasibly be prepared as described in copending application of Albert B. Schwartz, Serial No. 430,212, filed February 3, 1965, by growing crystals of the alumino-silicate in the pores of the support. Also, the alumino-silicate may be intimately composited with a suitable binder, such as inorganic oxide hydrogel or clay, for example by ball milling the two materials together over an extended period of time, preferably in the presence of water, under conditions to reduce the particle size of the alumino-silicate to a weight mean particle diameter of less than 40 microns and preferably less than 15 microns. Also, the alumino-silicate may be combined with and distributed throughout a gel matrix by dispersing the alumino-silicate in powdered form in an inorganic oxide hydrosol. In accordance with this procedure, the finely divided alumino-silicate may be dispersed in an already prepared hydrosol or, as is preferable, where the hydrosol is characterized by a short time of gelation, the finely divided alumino-silicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the alumino-silicate and then dried and calcined.

The inorganic oxide gel employed, as described above as a matrix for the metal alumino-silicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups IIA, IIIB, and IVA of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well-known in the art, such as for example, hydrolysis of ethyl orthosilicate, acidification of an alkali metal silicate and a salt of a metal, the oxide of which is desired to cogel with silica, etc. The relative proportions of finely divided crystalline alumino-silicate and inorganic oxide gel matrix may vary widely with the crystalline alumino-silicate content ranging from about 2 to about 90 percent by weight and more usually, particularly where the composite is prepared in the form of beads, in the range of about 5 to about 50 percent by weight of the composite.

The catalyst of alumino-silicate employed in the process of this invention may be used in the form of small fragments of a size best suited for operation under the specific conditions existing. Thus, the catalyst may be in the form of a finely divided powder or may be in the form of pellets of $1/16''$ to $1/8''$ size, for example, obtained upon pelleting the alumino-silicate with a suitable binder such as clay. The zeolite X, described hereinabove, may be obtained on a clay-free basis or in the form of pellets in which clay is present as a binder.

The alkylation process of this invention may be carried out at relatively mild operating conditions thereby increasing catalyst life, avoiding frequent regeneration of used catalyst and facilitating use of wide variety of alkylatable heterocyclic compounds and alkylating agents.

The temperature of this process may extend from about 50° C. to about 300° C.; preferably, the process is operated from temperatures of about 100° to 200° C. The choice of temperatures, particularly the lower limits, is in part dependent upon the reactants to be employed.

Thus, a highly reactive furan compound may react with an olefin such as terpene to some extent at room temperatures. Usually, however, at such temperatures extended periods of contact with the catalyst are required and low yields of the desired alkylated heterocyclic compounds are produced.

The upper temperature limits are, in general, determined by the chemical stability of the alkylating agents as well as the nuclear stability of the heterocyclic ring structure to be alkylated. For example, above about 300° C., olefins and those compounds convertible to the olefins, i.e., the alkyl halides, undergo several side reactions such as polymerization and degradation, thereby substantially reducing the amount of alkylating agents available for reaction and also providing tarry-like residues which clog or block off the pores or passages within the ordered internal structure of the alumino-silicate catalyst. Moreover, at the higher temperatures the stability of the heterocyclic ring is substantially reduced causing ring cleavage and subsequent reduction of the desired distribution of reaction products.

The alkylation process may be carried out at atmospheric or greater than atmospheric pressure, e.g., 400 to 500 p.s.i.g. Preferably, the pressure is sufficient to maintain at least one of the reactants or reaction products in the liquid phase when the alkylating agent is an olefin. Mixed vapor-liquid phase or liquid phase operation is believed to promote higher yields of alkylation products and increase the length of catalytic activity by preventing formation of olefinic polymers and by washing out other high molecular weight by-product compounds from the internal structure of the catalyst produced by the above-mentioned side reactions. However, in some cases where the heterocyclic compound exhibits a greater bonding tendency in the liquid phase or where the alkylating agent is less likely to polymerize (e.g., the alcohols), it is preferable to operate at atmospheric pressure thereby promoting operation in the vapor phase.

Referring to the relative molar proportions of reactants, the molar ratio of the heterocyclic compound to an alkylating agent may vary from a ratio of about 0.1:1 to a ratio of about 10:1. The alkylating agent is often used in smaller quantities since many, such as the olefins and the alkyl halides, tend to polymerize in the presence of the alumino-silicate catalyst of this invention. It will be appreciated that the specific molar ratios between the reactants are determined by the nature of the reactants, the operating condition employed, and the alumino-silicate catalyst being used.

It will be appreciated that, because of the unique activity shown by the alumino-silicate catalysts contemplated by the present invention, the alkylating agents may be employed in fluid media which contain major proportions of inert diluents such as nitrogen and the like. The advantages of such operation will readily be apparent because of the availability and low cost of obtaining such dilute process streams during hydrocarbon processing. In addition, by employing dilute olefin streams the formation of polymerized products within or on the ordered internal structure of the alumino-silicate catalysts is substantially reduced. As will be more fully amplified in the examples, the concentration of these fluid streams has a pronounced effect on the catalysts employed by the process.

In addition, the alumino-silicate contemplated by this invention may be continuously activated so as to maintain a high level of activity while on stream. This continual activation is effected by controlling the sparsity of distribution of active acid sites formed within the ordered internal structure of the catalyst. It will be realized that, during alkylation of the heterocyclic compounds, some degradation and polymerization products are formed which produce a coke-like material on the alumino-silicate catalyst. The accumulation of this material causes the catalyst to gradually lose its effective activity by blocking off the active acid sites for contact with the reactants. However, it has been found that the affects of these undersirable products may be controlled by the introduction of carbon dioxide in the charge stream and/or by the introduction of controlled amounts of water, water vapor, steam, and other like oxygen-containing compounds into the reactant streams. It will be appreciated that these activators may be introduced into the charge stream or in separate streams if desired. The activators are particularly effective with alkali metal salts of the alumino-silicate catalyst, e.g., the sodium form of zeolite X. In general, the molar ratio between the reactants and the activating materials may range from about 0.001 to about 0.5. It will be appreciated that the selection of a particular activating material as well as its mode of introduction, will be dependent upon the catalyst to be activated and the reactants being employed.

It will be also appreciated that the operating conditions employed by the present invention will be dependent on the specific alklation reaction being effected. Such conditions as temperature, pressure, space velocity, and molar ratio of the reactants and the presence of inert diluents will have important affects on the process. Accordingly, the manner in which these conditions affects not only the conversion and distribution of the resulting alkylated heterocyclic products but also the rate of deactivation of the catalyst will be described below.

The process of this invention and the results obtained thereby may be more readily understood by reference to the following examples which are illustrative of the reactants operating conditions and the catalyst employed herein.

The followig examples were conducted as batch as well as continuous processes. The batch processes utilized a conventional heated pressurized autoclave while the continuous processes used a tubular reactor wrapped with aluminum foil and insulation and heated by an electrical resistance wire. Product composition was evaluated by fractionation, gas chromatography and infrared techniques.

EXAMPLE I

Batch alkylation of thiophene with isopropyl chloride was conducted in a closed autoclave containing 30 grams of catalyst prepared from a hydrogen exchanged Y molecular sieve material ($S_1O_2/Al_2O_3$ of 6). The autoclave was first charged with 170 grams liquid thiophene so as to completely saturate the catalyst then 156 grams of isopropyl chloride were added to the autoclave and the reactor maintained at a temperature of 200° C. After six hours, 300 grams of reaction product were removed from the autoclave and the catalyst separated by filtration. Analysis gave the following composition:

*Table 1*

ALKYLATION OF THIOPHENE WITH ISOPROPYL CHLORIDE OVER HYDROGEN-EXCHANGED ZEOLITE Y CATALYST

| Product Composition | Weight percent | Weight grams |
|---|---|---|
| Isopropylthiophene | 49 | 125 |
| 2,3-diisopropylthiophene | 9 | 40 |

EXAMPLE II

Continuous alkylation of thiophene with isobutylene was effected in the presence of an acid mordenite catalyst in a tubular reactor. Two grams of the catalyst were placed in the reactor and heated to 250° C. Then isobutylene gas at a rate of 0.25 cubic feet per hour and thiophene at a liquid rate of 4 ml. per hour were simultaneously passed over the heated catalyst. After intervals of thirty minutes and sixty minutes, samples were taken from the liquid trapped in the condensing system connected to the outlet of the reactor. Analysis of these samples gave the following results:

Table 2

ALKYLATION OF THIOPHENE WITH ISOBUTYLENE OVER AN ACID MORDENITE CATALYST

| Conditions: | | |
|---|---|---|
| Temperature, °C | 250 | 250 |
| Time on stream, mins | 30 | 60 |
| Produce composition, weight percent: | | |
| Isobutylene | 16.2 | 17.1 |
| Thiophene | 63.8 | 65.5 |
| 2- and 3-t-butylthiophene | 10.1 | 12.7 |
| Di-t-butylthiophene | 1.9 | 7.6 |
| Diisobutylene | 5.8 | 3.3 |
| Others | 2.1 | 0.8 |

EXAMPLE III

In this example a catalyst of hydrogen exchanged zeolite Y molecular sieve material having a $SiO_2/Al_2O_3$ of 6.0 (prepared by calcining ammonium exchanged Y zeolite at 1000° F. for four hours) was placed in a tubular reactor and heated to 200° C. Then isobutylene gas (0.25 cubic feet per hour) and thiophene (4 ml. per hour) were simultaneously passed over the heated catalyst. After 60 minutes and 120 minutes on stream, liquid samples were taken from the condensing system connected to the reactor. Analysis of these samples gave the following composition:

Table 3

ALKYLATION OF THIOPHENE WITH ISOBUTYLENE OVER A HYDROGEN EXCHANGED ZEOLITE Y CATALYST

| Conditions: | | |
|---|---|---|
| Temperature, °C | 200 | 200 |
| Time on stream, mins | 60 | 120 |
| Product composition, weight percent: | | |
| Isobutylene | 16.0 | 14.2 |
| Thiophene | 56.0 | 58.2 |
| 2- and 3-t-butylthiophene | 9.3 | 15.8 |
| Di-t-butylthiophene | 2.7 | 0.9 |
| Diisobutylene | 15.0 | 10.1 |
| Others | 1.0 | 0.8 |

From the above examples it will be seen that both acid mordenite and hydrogen exchanged zeolite Y provide effective catalysts for the alkylation of thiophenes in either batch-type or continuous operation processes. In addition, during continuous operation, both catalysts maintained a high level of activity for prolonged periods on stream. Also, both catalysts showed an increase in activity together with high selectivity for the desired alkylation products. This selectivity is evidenced by the decrease of the amount of diisobutylene as well as the "other" products found in the reaction products after continuous on-stream operation.

EXAMPLE IV

The use of alumino-silicate catalysts having a particularly sparse distribution of acid sites is illustrated by this example. An alumino-silicate catalyst was prepared from a binder-free "10X" Linde molecular sieve material that had been crushed to a size of from 8 to 14 mesh, and then calcined for one hour in air at 340° C. This catalyst was then placed in a reactor and cooled to 204° C. with a stream of nitrogen gas for one minute. After the nitrogen had been passed through the catalyst, a liquid charge stock of thiophene (84.1 grams) and t-butyl alcohol (74.1 grams) was admitted at a rate of 13.6 cc. per hour (liquid hourly space velocity of 6.8). After 60 minutes on stream the temperature of the reactor was raised to 246° C. and operation continued for several minutes. Then the reactor temperature was raised to 288° C. Samples taken periodically from 30 minutes on stream to 180 minutes on stream indicated that significant conversions of thiophene to t-butylthiophenes were realized. As shown by the following analysis of the samples, high conversions were obtained during the entire extended run.

Table 4

ALKYLATION OF THIOPHENE WITH TERTIARY BUTYL ALCOHOL OVER A CATALYST PREPARED FROM THE CALCIUM FORM OF ZEOLITE X

Conditions:
 Reaction Temp. 204–208° C.
 Atmospheric pressure.
 LHSV=6.8.
 $N_2$, carrier gas (5 cc./min.).
 Thiophene/t-butyl alcohol (molar ratio=1:1).

| Temperature, °C | 204° | 246° | 288° | |
|---|---|---|---|---|
| Time on stream, mins | 30 | 60 | 120 | 180 |
| Product composition, weight percent: | | | | |
| Isobutylene | 12.8 | 14.3 | 13.8 | 14.4 |
| t-Butyl alcohol | | | | |
| Thiophene | 62.0 | 67.1 | 62.7 | 76.4 |
| 2- and 3-t-butylthiophene | 11.3 | 8.8 | 15.0 | 8.0 |
| Di-t-butylthiophene | 10.9 | 7.5 | 7.1 | 0.9 |
| Others | 2.7 | 2.3 | 1.4 | 0.3 |
| | 99.7 | 100 | 100 | 100 |

Note.—Color of Discharged Catalyst—brownish black.

From the above data, it will be apparent that about 18 percent of the thiophene was converted to the t-butylthiophene at 246° C. At this temperature it was also found that the ratio of mono-t-butylthiophene to di-t-butylthiophene was about 2:1. In addition, as evidenced by the occurrence of isobutylene in the reaction products, dehydration of t-butyl alcohol is a competitive side reaction that becomes more pronounced at higher operating temperatures, i.e., 288° C. Also the brownish black color of the discharged catalyst suggests that polymerization of these olefins also serve to reduce the effective activity of the catalyst by the formation of coke-like deposits at the higher temperatures.

EXAMPLE V

Using a catalyst prepared from a rare earth exchanged zeolite X, thiophene and t-butyl alcohol at a molar ratio of 4:1 were passed through a tubular reactor at a LHSV of 5.5 and at atmospheric pressure. From 28° to 108° C. no alkylation occured. However, at 204° C., 3.8 weight percent of alkylated thiophenes appeared in the reaction mixture. After the reactor was raised to 245° C., 0.7 weight per cent of an alkylated thiophene was obtained. Subsequent raising of the reactor to 288° C. gave 0.7 weight percent of an alkylated thiophene. Here again a more acid catalyst exhibited activity for effecting alkylation, but the activity began to drop off at the higher temperatures. Apparently, this decline in activity is due to competing side reactions such as dehydration and subsequent polymerization of the alkylating agent.

EXAMPLE VI

The alkylation of pyridine is illustrated by its reaction with ethylchloride in the presence of hydrogen exchanged Y zeolite (the same catalyst as employed in Example I) within a tubular reactor. Continuous alkylation was conducted by passing a liquid charge stock of pyridine-ethylchloride (1 mole pyridine for 2 moles ethylchloride) at atmospheric pressure and a liquid hourly space velocity of 0.5 over the catalytic material. At the initial temperature of 200° C., 11 percent of the entering pyridine was converted to ethylpyridine after 30 minutes on stream. Then the temperature of the reaction was raised to 250° C. and the sample removed after 60 minutes on stream showed 14 percent conversion of pyridine to ethylpyridine. After 90 minutes on stream, the temperature of the reaction was again raised to 300° C. and the conversion of pyridine to ethylpyridine increased to 23 percent. Table 5 below presents the data for this example:

*Table 5*

ALKYLATION OF PYRIDINE WITH ETHYLCHLORIDE OVER HYDROGEN EXCHANGED ZEOLITE Y CATALYST

| Conditions: | | | |
|---|---|---|---|
| Time on stream, mins | 30 | 60 | 90 |
| Temperature, °C | 200 | 250 | 300 |
| Liquid hourly space velocity of pyridine | 0.5 | 0.5 | 0.5 |
| Product composition, weight percent: | | | |
| Ethylpyridine | 11 | 14 | 23 |
| Other | 89 | 86 | 77 |

Inspection of the above data shows that the catalysts of this invention exhibit activity over a substantial range of temperatures during operation in the vapor phase. In addition, the heterocyclic compounds such as pyridine which are slightly basic, can be alkylated with a catalyst having a controlled distribution of acid sites such as the hydrogen exchanged zeolite Y catalyst.

EXAMPLE VII

This example shows that alkylation of furan in the presence of a catalyst prepared from the sodium form of zeolite X. A tubular reactor containing 10 ml. of the catalyst was heated to a temperature of 150° C. Then 50 ml. of a 23.3 wt. percent solution containing 14 gms. of furan and 46 gms. of ethanol was passed through the reactor at a rate of 8 ml. per hour. After 4 hours, liquid product was removed and the aqueous layer separated from the organic layer. The analysis of the organic layer is as follows:

Product composition: Wt. percent
Ethyl furan _____ 63
Diethyl furan _____ 7
Furan _____ 30

As previously indicated the less acidic catalyst prepared from the sodium form of zeolite X has a high level of activity for effecting alkylation of heterocyclic compounds. Moreover, the product composition data further shows that the less acidic catalyst apparently is highly selectively for effectiing alkylation at relatively low temperatures. (Note that no other reaction products were found in the liquid product stream.)

EXAMPLE VIII

The unique activity of activated naturally occurring alumino-silicates was shown by the batch alkylation of pyrrole with methanol in an autoclave reactor containing an acid mordenite catalyst. A charge made up of 67 gms. of pyrrole, 160 gms. of methanol, and 20 gms. of acid mordenite was placed into the closed autoclave; the methanol being added last. Then the temperature of the reactor was raised to 200° C. After 4 hours, the product was removed and the catalyst separated by filtration yielding 225 grams of product. Excess methanol was removed by heating on a steam bath at 100° C. with a stream of nitrogen gas bubbling through the solution. The final product was dried over anhydrous sodium sulfate and analyzed using vapor phase chromotography.

Product composition: Wt. percent
2- and 3-methylpyrroles _____ 44
2,3-dimethylpyrrole _____ 11
Other _____ 45

EXAMPLE XI

A solution of 10 grams of pyrrole in 50 grams of methanol was passed continuously over a bed of acid mordenite catalyst heated at 220° C. Samples of the liquid product were periodically withdrawn and analyzed for the methylpyrrole content. The results of these analyses are given below:

Time on stream, hr.: Wt. percent of methyl-
pyrrole in products
0.5 _____ 4.0
1.0 _____ 16.5
2.0 _____ 28.0
4.0 _____ 5.0

It will be appreciated that the data of Examples VIII and IX illustrate that acid catalysts having a relatively high concentration of acid sites are particularly effective for alkylation of those heterocyclic compounds which exhibit acidic characteristics such as pyrrole. In addition, both mono- and poly-alkylated products may be formed, the catalyst usually having greater selectively for the mono-substituted products.

It will be appreciated that the foregoing examples are merely illustrative of the alkylatable heterocyclic compounds, the alumino-silicate catalysts, and the alkylating agents which may be employed in the process of this invention and that other reactants and catalysts as enumerated in the specification may be effectively employed by this invention.

It will further be appreciated that the operating conditions for the alkylation reactions in accordance with the process of this invention, as exemplified in the foregoing examples and specification, may be varied so that the process can be conducted in a vapor phase, a liquid phase, or a mixed liquid-vapor phase, depending on the product distribution, the degree of alkylation, the rate of catalyst deactivation, and the reaction temperatures and pressures and that various modifications and alterations may be made in the process of this invention without departing from the spirit of the invention.

What is claimed is:

1. A process for alkylating heterocyclic compounds which comprises effecting reaction of a heterocyclic compound selected from the group consisting of mono- and poly-cyclic compounds having from three to eight cyclic members, one of said members being selected from the group consisting of nitrogen, oxygen, and sulphur with an alkylating agent selected from the group consisting of olefins containing from 3 to about 12 carbon atoms, alkyl halides and aliphatic alcohols containing from 1 to about 10 carbon atoms in the alkyl group, and cyclic unsaturated hydrocarbons and aryl alkyl esters containing from 6 to about 12 carbon atoms under conversion conditions in the presence of a catalyst comprising a crystalline alumino-silicate having exchangeable cations which provide acid sites within an ordered internal structure, said ordered internal structure having a defined pore size of at least 6 A.

2. The process of claim 1 in which said heterocyclic compound is selected from the group consisting of furans, pyrroles, thiophenes, pyrans, pyridines, thiophanes and condensed systems thereof.

3. The process of claim 1 in which the crystalline alumino-silicate has a silicon to aluminum atomic ratio of at least 1.8 within an ordered internal structure.

4. The process of claim 1 in which the alumino-silicate catalyst is a rare earth exchanged faujasite.

5. The process of claim 1 in which the alumino-silicate catalyst is acid mordenite.

6. The process of claim 1 in which the alumino-silicate catalyst is a hydrogen exchanged zeolite Y.

7. The process of claim 1 in which the alumino-silicate is contained in and distributed throughout a matrix binder.

8. The process of claim 1 in which the alumino-silicate catalyst is an alkali metal crystalline alumino-silicate activated by an oxygen containing compound selected from the group consisting of $CO_2$, $H_2O$ and mixtures thereof.

9. The process of claim 1 in which the heterocyclic compound is allowed to saturate the catalyst before the alkylating agent is in the presence of said catalyst.

10. A process for producing alkylated thiophenes which comprises effecting reaction of thiophene and isopropyl chloride in the presence of a catalyst consisting essentially of a hydrogen exchanged zeolite Y in an autoclave under pressure of a temperature of from about 150° to about 250° C., and recovering a product consisting of a mixture of isopropylthiophene and 2,3-diisopropylthiophene.

11. A process for producing alkylated thiophenes which comprises effecting reaction of thiophene and isobutylene in the presence of a catalyst consisting essentially of an acid mordenite at a temperature from about 200° to about 300° C., and recovering a product consisting of a mixture of 2- and 3-butylthiophene and di-t-butylthiophene.

12. A process for producing alkylated thiophenes which comprises effecting reaction of thiophene and isobutylene in the presence of a catalyst consisting essentially of a hydrogen exchanged zeolite Y at a temperature from about 150° to about 250° C., and recovering a product consisting of a mixture of 2- and 3-t-butylthiophene and di-t-butylthiophene.

13. A process for producing alkylated thiophenes which comprises effecting reaction of thiophene and t-butyl alcohol in the presence of a catalyst consisting essentially of the calcium form of zeolite X at a temperature from about 200° to about 300° C., and recovering a product consisting of a mixture of 2- and 3-t-butylthiophene and di-t-butylthiophene.

14. A process for producing an alkylated thiophene which comprises effecting reaction of thiophene and t-butyl alcohol in the presence of a catalyst consisting essentially of a rare earth exchanged zeolite X at a temperature of from about 200° to about 300° C., and recovering an alkyl thiophene product.

15. A process for producing an alkylated pyridine which comprises effecting reaction of pyridine and ethyl chloride in the presence of a catalyst consisting essentially of a hydrogen exchanged zeolite Y at atmospheric pressure and at a temperature from about 200° to about 300° C., and recovering an ethyl pyridine product.

16. A process for producing an alkylated furan which comprises effecting reaction of furan and ethanol in the presence of a catalyst consisting essentially of the sodium form of zeolite X at a temperature from about 100° to about 200° C., and recovering a product consisting of a mixture of ethyl furan and diethyl furan.

17. A process for producing an alkylated pyrrole which comprises effecting reaction of pyrrole and methanol in the presence of a catalyst consisting essentially of acid mordenite in an autoclave under pressure at a temperature form about 150° to about 250° C., and recovering a product consisting of a mixture of 2- and 3-methyl pyrroles and 2,3-dimethyl pyrrole.

18. A process for producing an alkylated pyrrole which comprises effecting reaction of pyrrole and methanol in the presence of a catalyst consisting essentially of acid mordenite at a temperature from about 170° to about 270° C., and recovering a methylpyrrole product.

19. The process of claim 1 in which said alumino-silicate catalyst has a distribution of acid sites whereby its activity is selectively enhanced for alklylation of certain heterocyclic compounds.

20. The process of claim 1 in which said alumino-silicate catalyst is selected from the group consisting of alkali and alkaline earth metal forms of faujasite.

21. The process of claim 1 in which said reaction is conducted at a temperature from about 50° C. to about 300° C. and at a pressure from about atmospheric to about 500 p.s.i.g.

References Cited by the Examiner

UNITED STATES PATENTS 2,910,515  10/1959  Luvisi et al. _____ 260—290 X
3,121,754  2/1964  Mattox et al. _____ 260—672

WALTER A. MODANCE, *Primary Examiner.*

NICHOLAS S. RIZZO, *Examiner.*

JOHN M. FORD, MARION W. WESTERN,
*Assistant Examiners.*